April 17, 1956 S. H. BARNES ET AL 2,742,383

GERMANIUM JUNCTION-TYPE SEMICONDUCTOR DEVICES

Filed Aug. 9, 1952

INVENTORS.
SANFORD H. BARNES,
BY JUSTICE N. CARMAN, JR.,
Seymour M. Rosenberg
ATTORNEY.

United States Patent Office 2,742,383

Patented Apr. 17, 1956

2,742,383

GERMANIUM JUNCTION-TYPE SEMICONDUCTOR DEVICES

Sanford H. Barnes and Justice N. Carman, Jr., Los Angeles, Calif., assignors, by mesne assignments, to Hughes Aircraft Company, a corporation of Delaware Application August 9, 1952, Serial No. 303,626

12 Claims. (Cl. 148—33)

This invention relates to junction-type semiconductor devices, and more particularly to junction-type semiconductor devices wherein an alloy of a donor impurity is fused with a P-type monatomic semiconductor starting specimen, and methods of making such devices.

In the semiconductor art, a region of monatomic semiconductor material containing an excess of donor impurities and yielding an excess of free electrons is considered to be an N-type region, while a P-type region is one containing an excess of acceptor impurities resulting in a deficit of electrons, or stated differently, an excess of holes. When a continuous solid specimen of monatomic semiconductor material has one N-type region and one P-type region, it is termed a P–N junction semiconductor device, while a specimen having two N-type regions separated by a P-type region is termed an N–P–N junction semiconductor device.

The term "monatomic semiconductor material," as utilized herein, is considered generic to both germanium and silicon. Although the invention will be disclosed with particular reference to germanium, it is to be understood that silicon may be utilized equally well in the junction-type semiconductor devices of the present invention.

The term "active impurities" is used to denote those impurities which affect the electrical rectification characteristics of monatomic semiconductor material, as distinguishable from other impurities which have no appreciable effect upon these characteristics. Generally, active impurities are added intentionally to the base semiconductor material, although in many instances, certain of these impurities may be found in the original base material. Active impurities are classified as either donors, such as antimony, arsenic or phosphorous, or acceptors, such as indium, gallium and aluminum.

In the prior art, N–P–N junctions in monatomic semiconductors have been produced during the process of growing a single crystal from a melt of the base semiconductor material. According to this prior art method, a seed crystal is brought into contact with a melt of N-type germanium, that is germanium containing an impurity of the donor type, and is then withdrawn from the melt at such a rate as to maintain the boundary between the growing solid crystal and the liquid melt substantially planar. When the crystal has grown to a suitable length, the melt is doped with an active impurity of the acceptor type in sufficient quantity to change the melt to P-type germanium. Thereafter, as the crystal continues to grow, a region of P-type germanium is produced, this region including both acceptor and donor impurities, since the original donor impurities cannot be removed during the crystal growing process. When the crystal has grown to include a region of P-type germanium having a thickness of the order of several thousandths of an inch, the melt is again doped with a donor impurity in sufficient quantity to overcome the effect of the previously added acceptor impurity thereby restoring the melt to N-type germanium. As the crystal continues to grow, it now includes a second region of N-type germanium separated from the first N-type region by the P-type region.

This prior art method of producing N–P–N junction semiconductor devices has several inherent limitations. Firstly, it is impossible to produce a junction transistor having similar active impurity concentrations in the two N-type regions, since overdoping is utilized to change the characteristics of the melt each time a junction is desired in the growing crystal. Secondly, the method is not readily adapted to mass production, since the rate of withdrawal of the crystal is limited by temperature factors and by the condition that the boundary between the crystal and the melt remain substantially planar. Thirdly, this prior art method of producing N–P–N transistors is relatively expensive because a new melt must be utilized for each crystal which is grown, and the relatively thin P-type region of the completed crystal must be located and an electrode connected thereto with the aid of a microscope. Fourthly, it is impossible to utilize this prior art method to produce semiconductor devices having more than two N-type regions separated by a single P-type region.

The above prior art method for producing N–P–N junction-type transistors is also applicable to the production of P–N–P junction transistors in which two P-type regions are separated by an N-type region. However, it has been found that semiconductor devices having N–P–N junctions therein are electrically superior to P–N–P junction devices. More particularly, the frequency response of N–P–N junction devices has been observed to be considerably higher than the frequency response of corresponding P–N–P junction devices. It is generally considered in the art that this phenomenon is produced because electrons, which are the electrical current carriers in N–P–N junction devices, have a drift mobility which is greater than the drift mobility of holes, which are the electrical current carriers in P–N–P junction devices.

In the prior art, P–N–P junction semiconductor devices also have been produced by fusing small amounts of an acceptor impurity having a low melting point with portions of an N-type germanium starting specimen. According to this prior art method, a predetermined amount of an acceptor impurity, such as indium, for example, is placed in contact with a surface of an N-type germanium specimen. The specimen and the contacting indium are then heated to a value of temperature above the melting point of indium but below the normal melting point of germanium in order to fuse a portion of the indium with the adjacent region of the specimen, thereby producing a P-type region in the semiconductor specimen. By repeating this process on the opposite surface of the germanium specimen, a P–N–P junction transistor is produced.

Although the fusion technique set forth above has proven satisfactory for producing P–N–P junction semiconductor devices, it has been the experience of those skilled in the art that the fusion technique is inapplicable to the production of N–P–N junction devices. In other words, all attempts to produce an N–P–N junction in a semiconductor specimen by fusing an active impurity of the donor type with a portion of a P-type germanium specimen have proven unsuccessful. The apparent reasons why donor impurities have not been utilized successfully in this prior art method are best understood by considering certain characteristics of the donor impurities themselves.

Firstly, the element phosphorous is far too unstable under ambient atmospheric conditions to be utilized as a donor impurity in the fusion process. Secondly, the temperatures required to melt both antimony and arsenic are sufficiently high to destroy the electrical rectification properties of a germanium specimen when the specimen is subjected to these values of temperature. Thirdly, the temperature to which bismuth must be raised in order to dissolve an appreciable amount of germanium is sufficiently high to damage the germanium specimen. Accordingly, the fusion method of producing junction-type semiconductor devices has been heretofore limited to the manufacture of P–N–P junctions.

The present invention, on the other hand, provides junction-type semiconductor devices and methods for making them which obviate the above and other disadvantages of the prior art semiconductor articles and methods while incorporating the principal advantages of the two prior art techniques set forth above. Although the present invention will be described with particular reference to N–P–N junction semiconductor devices, it will be apparent to those skilled in the art that the methods of the present invention are also applicable to the production of P–N junction semiconductor devices wherein the starting material is P-type germanium. In addition the methods of this invention are equally applicable to other forms of multiple junction semiconductor devices, such as a device including more than two N-type regions separated from each other by a single P-type region.

According to the basic concept of the present invention, N–P–N junction semiconductor devices are produced in which a metallic alloy, including an active impurity of the donor type, is coalesced with portions of a P-type monatomic semiconductor specimen, thereby providing junction-type semiconductor devices in which the active impurity concentrations in the N-type regions are of substantially the same order of magnitude. More particularly, the junction-type semiconductor devices of the present invention are produced by heating a P-type germanium starting specimen and a contacting alloy, including an active impurity of the donor type, to a value of temperature whereat the alloy is melted and is coalesced with the adjacent region of the germanium specimen, thereby producing an N-type region in the specimen.

Coalescence of the alloy with the germanium specimen is effected by raising the temperature of the combination of the alloy and the germanium specimen until the alloy melts. The precise phenomenon which occurs thereafter to produce an N-type region in the P-type starting specimen has not been determined positively. According to one school of thought, it is considered that donor atoms from the melted alloy are diffused into the adjacent region of the P-type germanium specimen, thereby converting this region to N-type germanium. However, according to another school of thought, it is considered that the molten alloy dissolves or melts a portion of the germanium specimen immediately adjacent the alloy, thereby doping the dissolved or molten germanium with atoms of donor impurity by a fusion process. Although there are arguments which lend credence to both of the above theories, it is generally considered that the N-type region in the semiconductor specimen is produced predominantly by fusion of the alloy and the adjacent region of the specimen, and that diffusion of donor atoms into the germanium also contributes, but to a lesser extent, to the production of the N-type region in the specimen.

The constituents of the donor alloy utilized are selected in view of four factors. Firstly, the alloy must have a melting point low enough to prevent damage to the semiconductor specimen during the heating operation, since it has been found that excessive heat destroys the electrical rectification properties of monatomic semiconductor material. Secondly, the melting point of the alloy must be sufficiently high to prevent the semiconductor device from being damaged when it is being operated under relatively high ambient temperature conditions or when electrical connections are being soldered or otherwise secured thereto. Thirdly, the selected alloy should contain sufficient donor atoms to provide a doped N-type region in the P-type specimen, and fourthly, the alloy should be capable of melting or dissolving germanium in sufficient quantities to produce an adequate N-type region in the semiconductor specimen.

More specifically, one alloy which has proven satisfactory in the articles and methods of the present invention consists essentially of antimony, tin and bismuth. The function of the tin and bismuth is primarily to cause the alloy to melt in the temperature range from approximately 150° C. to 500° C., and to dissolve or melt sufficient germanium to permit the production of an N-type region in the specimen. The function of the antimony is, of course, to provide sufficient donor atoms to the molten region of the germanium to create an N-type region therein. Although antimony appears to be preferable as the donor impurity, other donor impurities, such as arsenic, for example, may be used equally well in the methods and articles of the present invention.

According to the methods of this invention, a portion of a semiconductor specimen may be coalesced with a pellet or button of donor alloy which has been positioned on the specimen. On the other hand, the alloy may be plated on a portion of the specimen prior to the application of heat for establishing an N-type region in the specimen adjacent the plated surface.

The semiconductor devices of the present invention are characterized by having relatively large surface areas for establishing ohmic connections to the N-type and P-type regions of the device. For example, when a pellet of the donor alloy is fused with a P-type starting specimen, a button consisting essentially of donor alloy from the original pellet protrudes from the surface of the specimen after the N-type region has been established in the specimen, thereby affording a convenient area for affixing an emitter or collector electrode. This button, of course, may be ground flush with the surface from which it protrudes without impairing the electrical properties of the semiconductor device.

In producing an N–P–N junction transistor according to this invention, for example, the methods disclosed may be carried out twice, once on each of two opposing surfaces of a P-type germanium crystal. The active impurity concentrations in the N-type regions of the resulting article may be accurately controlled by the composition and amount of alloy which is coalesced with the specimen on each of its two opposing surfaces. In addition, N–P–N transistors may be produced having a P-type region which is substantially biconcave in form and which has a volume equal to or greater than the volume of the adjacent N-type regions. The advantage of this type of configuration is that it provides an external surface area of P-type germanium of sufficient size to facilitate the attachment of a base electrode to the device, while still retaining the desired feature of having a P-type region of minimum thickness separating the N-type regions of the device.

It is, therefore, an object of this invention to provide semiconductor devices of the junction type in which an N-type region is established by doping a region of a P-type semiconductor starting specimen.

Another object of this invention is to provide junction-type semiconductor devices by coalescing an alloy including an active impurity of the donor type with a P-type semiconductor starting specimen.

A further object of this invention is to provide semiconductor devices having a plurality of N-type regions separated from each other by a P-type region.

An additional object of this invention is to provide N–P–N junction semiconductor devices in which the P-type region has a volume equal to or greater than the volume of either N-type region.

Still another object of this invention is to provide N–P–N junction type transistors in which the P-type region has a substantially biconcave configuration in order to facilitate attachment of a base electrode to the device.

It is an additional object of this invention to provide N–P–N junction transistors in which a metallic alloy including a donor impurity is fused to a P-type germanium starting specimen at opposite surfaces thereof.

It is still further an object of this invention to provide fusion-type multiple junction semiconductor devices having an improved frequency response.

It is still another object of this invention to provide methods for creating an N-type region in a P-type germanium starting specimen by doping a portion of the specimen.

It is also an object of this invention to provide multiple junction semiconductor devices having more than two N-type regions separated from each other by a P-type region.

Another object of this invention is to provide methods for producing junction-type semiconductor devices by fusing an alloy, including a donor impurity, with a P-type germanium starting specimen.

The novel features which are believed to be characteristic of this invention, both as to its organization and mode of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figure 1:
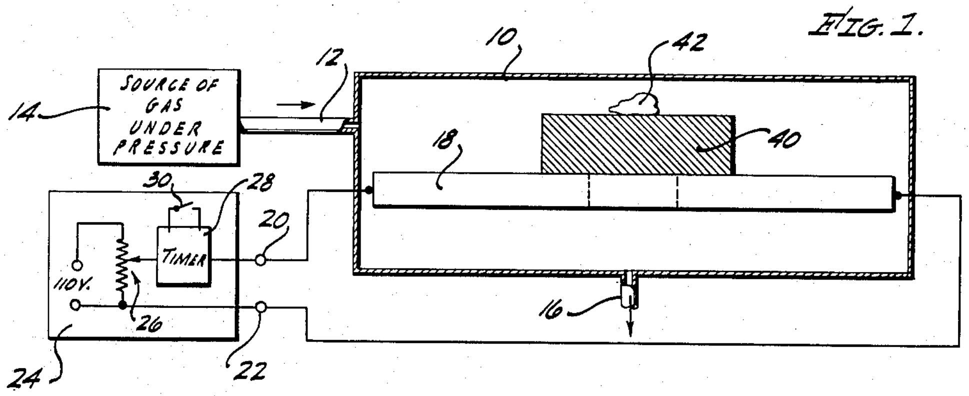
Fig. 1 is a schematic diagram, partly in section, of one form of apparatus for producing junction-type semiconductor devices according to the present invention.

Referring now to the drawings, wherein like reference characters designate like or corresponding parts throughout the several views, there is shown in Fig. 1 one form of apparatus for producing N–P–N junction semiconductor devices according to the methods of the present invention. The apparatus comprises a heating chamber 10 having an intake port 12 and an exhaust port 16, the intake port being coupled to a source 14 of gas under pressure. Positioned within chamber 10 is an electrically resistive heating element 18, the ends of which are electrically coupled without chamber 10 to two output terminals 20 and 22, respectively, of an electrical power source 24.

Heating element 18 is preferably constructed in the form of a flat strip, and may be composed of any suitable electrically resistive material such as a nickel-chrome alloy. Heating element 18 has an aperture 25 bored substantially in the middle thereof, and may be rigidly supported in chamber 10 by any suitable supporting means, not shown.

Electrical power source 24 may include any conventional electrical circuit which is controllable for supplying an electrical current to heater element 18. As shown in Fig. 1, for example, power source 24 includes a rheostat, generally designated 26, which is connected across a 110-volt alternating current source, not shown, and to a timer 28 which is energizable by a switch 30 for applying the potential output from rheostat 26 to output terminals 20 and 22 of power source 24.

Timer 28 may be any conventional electronic or electromechanical timing mechanism which is actuable for closing an associated electrical circuit for a predetermined time interval. Since numerous timers of this type are well known to the art, further description of timer 28 is considered unnecessary.

In operation, a specimen 40 of P-type germanium is positioned upon heating element 18, substantially as shown. Specimen 40 is preferably a single crystal of germanium, and has been etched in any of several suitable etchants known to the art in order to remove undesirable surface oxides or other impurities.

A pellet 42 of an alloy, including an active impurity of the donor type, is then placed upon the upper surface of specimen 40, substantially as shown in Fig. 1. The specific constituents which may be included in pellet 42 will be discussed in detail later. However, in order to properly disclose the methods of the present invention, three basic physical properties of the alloy are best set forth at this time. Firstly, the alloy should have a melting point within the temperature range between 150° C. and 500° C. Secondly, the alloy, when molten, should be able to readily dissolve or melt germanium, and thirdly, the alloy should include sufficient atoms of a donor impurity to produce an N-type region in the P-type germanium starting specimen.

After specimen 40 and pellet 42 have been properly positioned relative to heating element 18, chamber 10 is filled with a suitable gas, such as helium or hydrogen, from gas source 14 in order to surround specimen 40 with a nonoxidizing atmosphere, thereby preventing the formation of undesirable oxides on the surface of the specimen during the subsequent steps in the methods of this invention.

Switch 30 in power source 24 is now closed in order to supply electrical energy to heating element 18 for raising the temperature of specimen 40 and pellet 42 to a predetermined value above the melting point of pellet 42 and in the temperature range between 150° C. and 500° C. The precise temperature to which the germanium specimen is subjected may be controlled by rheostat 26 in power source 24, and is selected in view of the particular alloy utilized in pellet 42.

When pellet 42 is melted, it may assume a substantially spherical shape atop specimen 40, or it may spread out to cover a larger area on the upper surface of the specimen, depending upon the nature of the alloy utilized. In either case, the molten alloy wets the upper surface of the specimen, as viewed in Fig. 1, and starts to dissolve or melt the region of specimen 40 immediately adjacent the molten alloy.

As this adjacent region of specimen 40 is melted or dissolved by the alloy, donor atoms from the alloy are fused with the molten region in sufficient quantities to convert this region to N-type germanium. In addition, it is considered that some of the donor atoms are diffused into the adjacent crystal structure of the unmelted portion of specimen 40.

After a predetermined time interval, timer 28 in power source 24 interrupts the flow of electrical energy to heating element 18, thereby permitting the germanium and the alloy to cool. During the cooling interval, a portion of the molten germanium, including donor atoms in sufficient quantity to have converted this portion to N-type germanium, will grow onto the single crystal lattice structure of the unmelted portion of specimen 40. It is considered that this growth results from the fact that the bulk of specimen 40, which has remained unmelted, will conduct heat away from the region of the molten germanium and the alloy and thus permit the molten germanium and the alloy to cool and resolidify first at the adjacent surface of the unmelted portion of specimen 40, and then progressively outward toward the external surface of the molten region.

Figure 2:
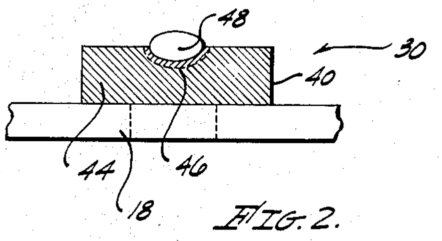
Fig. 2 is a schematic drawing, partly in section, of a junction-type semiconductor device according to one method of the present invention.

Referring now to Fig. 2, there is shown a single junction semiconductor device generally designated 30, which has been produced by the methods of the present invention. Device 30 comprises a single crystal specimen 40 which now includes a first portion 44 of P-type germanium having a substantially concave indentation therein. Immediately adjacent P-type portion 44 is a second portion 46 of N-type germanium. N-type portion 46 of specimen 40, is in turn, ohmically contacted by a button 48 which consists essentially of the remaining portion of the starting alloy and a relatively small amount of germanium which has not resolidified as part of specimen 40. In addition, it is generally considered that the germanium concentration in button 48 is not constant throughout the button, but instead has a gradient with a maximum germanium concentration in the region of button 48 adjacent N-type region 46 of specimen 40.

It should be recognized, of course, that the above description does not necessarily represent a precise exposition of the phenomenon which occurs during the production of N-type regions in the P-type starting specimens of the junction-type semiconductor devices, according to the present invention. For example, there is some disagreement as to whether fusion or diffusion of donor atoms is chiefly responsible for the production of the N-type region in the germanium specimen. In addition, although N-type region 46 and button 48 are shown in Fig. 2 to be two distinct entities, it may be considered that there is a gradual transition in chemical constituents from within the N-type region to the external surface of the button. However, whatever the precise concentration of germanium and alloy may be, it appears that P-type region 44 and at least a portion of N-type region 46 of specimen 40 are joined by the single crystal lattice structure of the original starting specimen.

Although Fig. 1 illustrates a pellet 42 of alloy which is utilized for establishing an N-type region in P-type germanium specimen, it is to be expressly understood that the alloy may also be plated upon a surface of the specimen prior to heating the specimen. One advantage which may be gained by plating the alloy on the specimen is that this technique lends itself readily to mass production. In addition, the plating technique affords rigorous control of the amount of alloy which is utilized with each P-type starting specimen.

The specific constituents of the alloy which may be utilized for establishing the N-type regions in the semiconductor devices of the present invention will now be considered. It may be recalled that these alloys possess certain generic physical properties; namely, they have a melting point above the highest operating temperature to which a semiconductor device might be reasonably subjected, generally considered to be 150° C.; they have a melting point lower than the value of temperature above which the structure of germanium crystals is adversely affected, generally considered to be 500° C.; they are capable, when molten, of readily dissolving or melting germanium; and they include sufficient atoms of a donor impurity to convert a region of P-type germanium to N-type germanium.

It has been found that antimony is preferable as one of the constituents of the alloys in order to provide the desired donor atoms therein. The selection of antimony as the donor impurity in the alloy is made in view of several factors. Firstly, antimony is easily handled without danger to personnel. Secondly, antimony will fuse readily with germanium, and thirdly, antimony has a melting point which is sufficiently low to permit the use of a reasonably large amount of donor impurity in the alloy without raising the melting point of the alloy above the temperature range previously set forth as desirable. It should be pointed out, however, that other donor impurities, notably arsenic, may also be utilized satisfactorily as the donor impurity in the alloy.

Research has indicated that several metallic elements, notably bismuth, tin or silver, may be alloyed with the donor impurity to act, when molten, as a germanium wetting agent in the alloy. In other words, these elements, when molten, readily dissolve or melt germanium with which they are in contact. In addition, the elements bismuth and tin have exceptionally low melting points and thereby contribute to lowering the melting point of the alloys to within the desired range of temperature. Furthermore, the elements tin and silver have been found to release any undesirable stresses which might develop due to the differences in thermal expansion.

More particularly, research has shown that various alloys of the above elements may be employed in producing the semiconductor devices of the present invention. It appears preferable, however, to utilize an alloy of antimony and bismuth, or an alloy of antimony, bismuth and tin for establishing the N-type region within the P-type germanium starting specimen. It should be pointed out, however, that semiconductor devices have also been produced in which alloys of antimony, and various combinations of bismuth, tin, silver, zinc, and cadmium have been utilized. By utilizing these alloys for producing a single P–N junction within a semiconductor specimen, junction-type semiconductor diodes may be produced which exhibit excellent rectifying characteristics.

In order to properly describe the utilization of these alloys in the methods and articles of the present invention, three other factors should be considered, namely, the amount of alloy utilized, the thickness of the P-type germanium starting specimen, and the value of temperature at which the heating step of the methods of this invention is carried out.

In view of extensive research and tests, it appears that the amount of alloy which is placed in contact with the germanium specimen is not a critical parameter. It has been found that the use of a relatively large amount of alloy will produce a relatively large button on the surface of the completed semiconductor device, and will increase the interelectrode capacity of the device. However, the depth of pentration of the button and the adjacent N-type region into the P-type starting specimen is not appreciably affected by the amount of alloy employed.

The penetration of the N-type region into the starting specimens is most significantly affected by the constituents of the alloy employed, and by the value of temperature at which the alloy is coalesced with the specimen. The precise value of temperature which is applied and the interval during which such temperature is maintained may be varied over a relatively large range, and are selected in view of the thickness of the starting specimen and whether it is desired to produce a single P–N junction or a multiple junction within the specimen. It is clear, for example, that in producing a junction-type diode according to this invention, the penetration of the N-type region into the germanium specimen is limited only by the thickness of the starting specimen.

The following table illustrates typical values which have been found suitable for the above parameters in order to produce single junction semiconductor devices according to this invention.

| Diameter of Alloy Pellet, inches | Alloy by Weight | Temperature, ° C. | Heating Interval, seconds | Thickness of Specimen, inches |
|---|---|---|---|---|
| .030 | 67% Bi-20% Sn -13% Sb | 450 | 7–10 | .015 |
| .030 | 80% Bi-20% Sb | 450 | 5–10 | .015 |

The electrical characteristics of the completed semiconductor devices may be improved by etching in the conventional manner known to the art. In addition these characteristics may be controlled by still other means, such as preselecting the resistivity of the germanium starting specimen. For example, single-junction devices produced by carrying out the method of this invention on relatively low resistivity P-type starting specimen exhibit excellent forward and reverse current characteristics, but have peak inverse voltage characteristics of the order of 80 volts. On the other hand, when a starting specimen of relatively high resistivity germanium is utilized, the peak inverse voltage characteristic of the device is improved considerably, but is accompanied by a slight decrease in forward current.

Referring again to Fig. 2, semiconductor device 30 may be utilized directly as a junction-type semiconductor diode by merely attaching two electrodes to P-type region 44 of specimen 40 and to button 48, respectively. If the alloy utilized for producing N-type region 46 has a melting point higher than the melting point of conventional solder, the electrodes may be readily soldered to the relatively large surface areas afforded by button 48 and P-type region 44 of the semiconductor device.

The single junction semiconductor device shown in Fig. 2 may also be utilized as a subassembly in the production of N–P–N junction transistors, according to the present invention, as will now be described.

Figure 3:
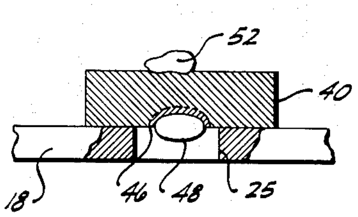
Fig. 3 is a sectional schematic diagram illustrating one method of producing an N–P–N junction semiconductor device according to the present invention.

Referring now to Fig. 3, there is shown one method in which the single-junction semiconductor device illustrated in Fig. 2 may be utilized in producing an N–P–N junction transistor, according to this invention. As shown in Fig. 3, specimen 40 has been inverted so that button 48 extends into aperture 25 in the center of heating element 18. Heating element 18 is here shown partly in section in order to illustrate the position of button 48 relative to the heating element.

After specimen 40 has been properly positioned on heating element 18, another pellet 52 of the alloy is placed upon the upper surface of specimen 40 opposite button 48. The previously described method of producing a single P–N junction in a P-type starting specimen is then again carried out on P-type region 44 of specimen 40, thereby coalescing the alloy in pellet 52 with the adjacent region of specimen 40 and creating a second N-type region within the specimen. Concomitant with the coalescence of pellet 52 with specimen 40, button 48 and adjacent N-type region 46 will penetrate still further into specimen 40 until a narrow region of P-type germanium of the order of one mil thick separates the two N-type regions in the specimen.

In carrying out the methods of this invention on transistors, it has been found preferable to establish the first N-type region in a shorter period of time than is utilized for establishing the second N-type region, since the first N-type region will continue to penetrate the starting specimen to some extent while the second N-type region is being established. For example, a pellet of antimony, bismuth and tin may be first coalesced with a P-type starting specimen approximately .010" thick for a period of 5 seconds at 400° C. The specimen is then inverted and another pellet of the same alloy may be coalesced with the P-type starting specimen for a period of approximately 10 seconds at 400° C. At the end of this interval, the penetration of each of the first and second N-type regions into the original specimen is of the same order of magnitude, and the P-type region separating the two N-type regions has a minimum thickness of the order to one to several mils.

The junction type transistors of the present invention exhibit excellent electrical characteristics, and current multiplication ($\alpha$) higher than .995 and as high as .999 are readily obtainable after etching in any of the conventional manners known to the art.

Figure 4:
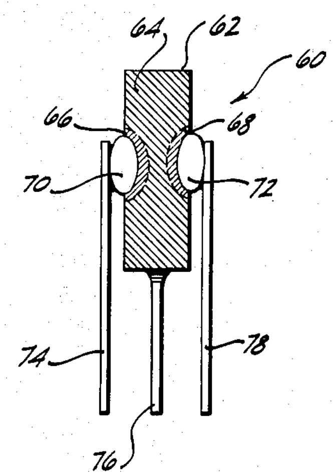
Fig. 4 is a sectional view of an N–P–N junction semiconductor device according to this invention.

Referring now to Fig. 4, there is shown an N–P–N transistor, generally designated 60, which has been produced by the methods of the present invention. Transistor 60 includes a single crystal germanium specimen 62 having a P-type region 64 of substantially biconcave configuration, and having first and second N-type regions 66 and 68, respectively, on opposite sides thereof. As shown in Fig. 4, N-type regions 66 and 68 are substantially converging meniscus in configuration and are adjacent the concave indentations in P-type region 64 of specimen 62. Adjacent N-type regions 66 and 68 and in ohmic contact therewith are two buttons 70 and 72, respectively, consisting essentially of a mixture of the alloy and germanium.

The advantage of producing junction-type transistors with the particular configuration shown in Fig. 4 is that the transistor has relatively large surface areas which may be utilized for connecting the associated electrodes to the device while retaining the desirable feature of having a P-type region of minimum thickness separating the N-type regions of the device. In practice, it has been found that N–P–N junctions may be readily produced in which the minimum thickness of the P–type region is of the order of one to several mils.

Electrodes may be connected to the N–P–N transistor devices of the present invention in any of numerous conventional manners known to the art. As shown in Fig. 4, for example, an emitter electrode 74, a base electrode 76 and a collector electrode 78 may be soldered to button 70, P-region 64 and button 72, respectively. It is clear, of course, that transistor 60 may be enclosed in a suitable envelope in any of numerous conventional manners known to the art. For example, the device may be enclosed in a thermosetting plastic, if desired.

Figure 5:
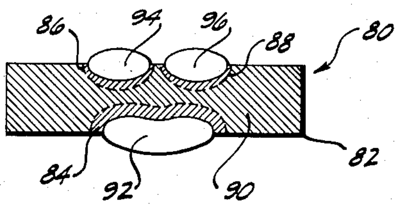
Fig. 5 is a sectional view of another form of multiple junction semiconductor device according to the present invention.

The methods herein disclosed may also be utilized for producing other forms of multiple junction semiconductor devices, according to the present invention. Referring now to Fig. 5, there is shown a multiple junction semiconductor device, generally designated 80, which has been produced by the methods of this invention. Semiconductor device 80 includes a germanium specimen 82 having three N-type regions 84, 86 and 88, respectively, which are separated by a P-type region 90. Adjacent N-type regions 84, 86 and 88 and in ohmic contact therewith are metallic alloy buttons 92, 94 and 96, respectively.

By utilizing a larger amount of alloy for establishing N-type region 84 than is employed in establishing each of N-type regions 86 and 88, the size of N-type region 84 may be made large enough to provide a relatively thin P-type region between region 84 and each of N-type regions 86 and 88. In addition, it will be noted that N-type region 84 has a slight dip or negative curvature adjacent P-type region 90. This configuration may be produced when multiple junction devices are produced with the apparatus shown in Figs. 1 to 3 by controlling the heat from heating element 18 when button 92 is within the aperture in the heating element. In this manner, an annular portion of button 92 and N-type region 84 adjacent the heating element will penetrate P-type region 90 further than the portion of button 92 and N-type region 84 which is positioned in and over the center of the aperture in the heating element. The advantage of having an N-type region with the particular configuration shown in Fig. 5 is that the barrier region between N-type region 84 and P-type region 90 may be made more nearly planar.

It is clear, of course, that other types of multiple junction semiconductor devices may be produced by the methods of this invention. In addition, N-type regions may be established in P-type semiconductors starting specimens wherein the shape and form of the regions of different conductivity type are different from those illustrated in the drawings.

Accordingly, it should be expressly understood that the foregoing disclosure relates to only preferred embodiments and methods of this invention, and that numerous modifications and alterations may be made therein without departing from the spirit and scope of the invention as set forth in the appended claims.

What is claimed as new is:

1. In a semiconductor translating device, the combination comprising: a germanium specimen having an indentation therein, said specimen having an N-type region immediately adjacent said indentation and a P-type region adjacent said N-type region; and a metallic button filling said indentation, said button consisting essentially of arsenic, germanium, and at least one element in which germanium is readily soluble.

2. In a semiconductor translating device, the combination comprising: a germanium specimen having an indentation therein, said specimen having an N-type region immediately adjacent said indentation and a P-type region adjacent said N-type region; and a metallic alloy button filling said indentation, said alloy button being ohmically connected to said N-type region and including germanium, an active impurity of the donor type, and an element in which germanium is soluble when said alloy is molten.

3. The combination defined in claim 2 wherein said alloy button consists essentially of arsenic, germanium, and bismuth.

4. In a semiconductor translating device, the combination comprising: a germanium specimen having an indentation therein, said specimen having an N-type region immediately adjacent said indentation, and a P-type region adjacent said N-type region; and an alloy button filling said indentation, said alloy button being ohmically connected to said N-type region and consisting of antimony, germanium, and an element in which germanium is soluble when said alloy button is molten.

5. In a semiconductor translating device, the combination comprising: a germanium specimen having an indentation therein, said specimen having an N-type region immediately adjacent said indentation, and a P-type region adjacent said N-type region; and an alloy button filling said indentation, said alloy button being ohmically connected to said N-type region and consisting of a donor impurity, germanium, and bismuth.

6. In a semiconductor translating device, the combination comprising: a germanium specimen including at least one face having an indentation therein, said speciment having an N-type region immediately adjacent said indentation and a P-type region adjacent said N-type region, and a metallic button filling said indentation, said button being an alloy consisting essentially of antimony, tin, bismuth, and germanium.

7. A semiconductor transistor comprising: a single crystal germanium specimen having first and second N-type regions and a P-type region separating said first and second regions, said P-type region being substantially biconcave in shape, and first and second metallic buttons molecularly connected to said first and second regions, respectively, said buttons including an alloy of active impurity of the donor type.

8. The semiconductor transistor defined in claim 7 which also includes an emitter electrode and a collector electrode in conductive contact with said first and second metallic buttons, respectively, and a base electrode in conductive contact with said P-type region, the area of contact between said base electrode and said P-type region being of the same order of magnitude as the area of contact between each of said buttons and its associated electrode.

9. In a semiconductor translating device, the combination comprising: a single crystal germanium specimen having an N-type region and a P-type region; and a metallic button molecularly connected to said N-type region and in ohmic contact therewith, said metallic button including germanium and an alloy consisting of 13 percent antimony, 20 percent tin and 67 percent bismuth, by weight.

10. A semiconductor transistor comprising: a germanium specimen having first and second N-type regions and a P-type region separating said first and second regions; first and second metallic buttons molecularly connected to said first and second regions, respectively, each of said buttons being in ohmic contact with its associated N-type region and including gremanium and a donor impurity.

11. The semiconductor transistor defined in claim 10 wherein each of said buttons is composed essentially of germanium and an alloy including a donor impurity, the melting point of the alloy being in the temperature range between 150° C. and 500° C.

12. The semiconductor transistor defined in claim 11 wherein each of said buttons consists essentially of germanium, antimony, tin and bismuth.

References Cited in the file of this patent

UNITED STATES PATENTS

| | | |
|---|---|---|
| 2,560,579 | Kock, et al. | July 17, 1951 |
| 2,569,347 | Shockley | Sept. 25, 1951 |
| 2,597,028 | Pfann | May 20, 1952 |
| 2,629,672 | Sparks | Feb. 24, 1953 |
| 2,644,852 | Dunlap | July 7, 1953 |
| 2,666,814 | Shockley | Jan. 19, 1954 |
| 2,672,528 | Shockley | Mar. 16, 1954 |

FOREIGN PATENTS

| | | |
|---|---|---|
| 506,110 | Belgium | Oct. 15, 1951 |